(12) United States Patent
Giedeman, III

(10) Patent No.: US 10,549,710 B2
(45) Date of Patent: Feb. 4, 2020

(54) VEHICLE AIRBAG

(71) Applicant: Ford Global Technologies, LLC, Dearborn, MI (US)

(72) Inventor: Lou Albert Giedeman, III, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 53 days.

(21) Appl. No.: 15/970,361

(22) Filed: May 3, 2018

(65) Prior Publication Data

US 2019/0337480 A1 Nov. 7, 2019

(51) Int. Cl.
*B60R 21/2338* (2011.01)
*B60R 21/205* (2011.01)
*B60R 21/235* (2006.01)

(52) U.S. Cl.
CPC ........ *B60R 21/2338* (2013.01); *B60R 21/205* (2013.01); *B60R 2021/23386* (2013.01); *B60R 2021/23547* (2013.01)

(58) Field of Classification Search
CPC ...... B60R 21/2338; B60R 2021/23386; B60R 21/205
See application file for complete search history.

(56) References Cited

U.S. PATENT DOCUMENTS

| | | | |
|---|---|---|---|
| 6,692,023 B2 * | 2/2004 | Tokita | B60R 21/233 280/743.1 |
| 7,192,053 B2 * | 3/2007 | Thomas | B60R 21/233 280/739 |
| 7,213,839 B2 | 5/2007 | Lockwood | |
| 7,484,757 B2 * | 2/2009 | Thomas | B60R 21/231 280/743.2 |
| 7,571,930 B2 | 8/2009 | Osterhout et al. | |
| 8,672,347 B2 | 3/2014 | Schneider et al. | |
| 9,156,427 B2 * | 10/2015 | Wang | B60R 21/232 |
| 9,650,010 B2 | 5/2017 | Wang et al. | |
| 2006/0290122 A1 | 12/2006 | Woydick | |
| 2007/0046009 A1 * | 3/2007 | Miura | B60R 21/233 280/743.2 |
| 2008/0290634 A1 | 11/2008 | Sugimori et al. | |

* cited by examiner

*Primary Examiner* — Faye M Fleming
(74) *Attorney, Agent, or Firm* — Frank A. MacKenzie; Bejin Bieneman PLC

(57) ABSTRACT

An airbag assembly includes an airbag and a tether. The tether includes a first end portion extending from the airbag, a second end portion spaced from the airbag, and an intermediate portion having a first strap and a second strap extending between and meeting each other at the first end portion and the second end portion. The first end portion, the second end portion, and the intermediate portion are monolithic.

19 Claims, 13 Drawing Sheets

VEHICLE AIRBAG

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position. The airbag assembly may include one or more tethers that shape and/or position the airbag in the inflated position.

DETAILED DESCRIPTION

Figure 1:
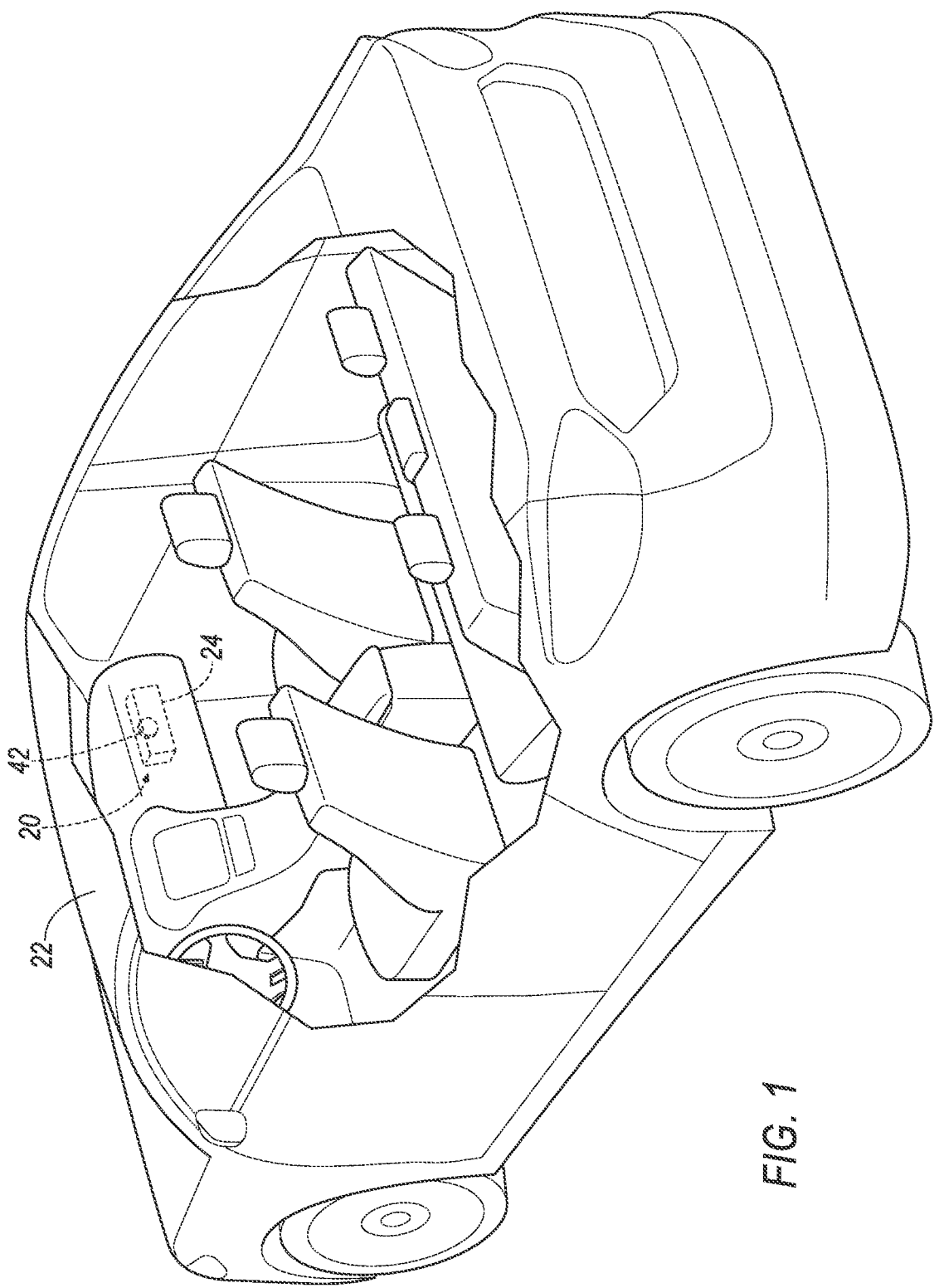
FIG. 1 is a perspective view of a vehicle having an airbag assembly in an uninflated position.

An airbag assembly includes an airbag and a tether. The tether includes a first end portion extending from the airbag, a second end portion spaced from the airbag, and an intermediate portion having a first strap and a second strap extending between and meeting each other at the first end portion and the second end portion. The first end portion, the second end portion, and the intermediate portion are monolithic.

The first end portion, the second end portion, and the intermediate portion may be one-piece woven.

The tether may include a first plurality of threads each extending along the first end portion, the second end portion, and the intermediate portion.

The tether may include a second plurality of threads extending transverse to and interwoven with the first plurality of threads.

The airbag may include a panel, and the panel and the tether may be monolithic.

The panel, the first end portion, the second end portion, and the intermediate portion may be one-piece woven.

The airbag may include a plurality of threads extending along the panel, the first end portion, the second end portion, and the intermediate portion.

The first strap and the second strap may be fixed to the first end portion at a first location and to the second end portion at a second location spaced from the first location.

The airbag assembly may include an anchor plate, the tether fixed to the anchor plate.

The intermediate portion of the tether may define a loop and the anchor plate may define a hole, and the anchor plate may be in the loop and the tether may be in the hole.

The anchor plate may include a first planar portion defining the hole, and a second planar portion extending transversely from the first planar portion and defining a second hole.

The airbag assembly may include an inflator, the intermediate portion of the tether may define a loop, and the inflator may be in the loop.

A method of forming an airbag tether includes providing a roll of woven fabric, the roll elongated along an axis, the woven fabric having a first end portion and a second end portion spaced from each other along the axis and each having a single panel, and an intermediate portion extending between the first end portion and the second end portion and having double panels. The method includes unrolling an amount of the woven fabric from the roll. The method includes cutting a tether from the unrolled amount of woven fabric along the first end portion, the second end portion, and the intermediate portion to separate the tether from the roll of woven fabric. The method includes fixing the tether to a component of an airbag assembly.

The component of the of the airbag assembly may be an anchor plate that defines a hole.

Fixing the tether to the anchor plate includes placing the tether into the hole, and then placing the anchor plate into a loop of an intermediate portion of the tether.

The component of the of the airbag assembly may be an inflator.

Fixing the tether to the inflator includes placing the inflator into a loop of an intermediate portion of the tether.

The roll of woven fabric may be one-piece woven.

Providing the roll of woven fabric may include forming the woven fabric by one-piece weaving.

With reference to the Figures, wherein like numerals indicate like parts throughout the several views, an airbag assembly 20 for a vehicle 22 includes an airbag 24 and a tether 26. The tether 26 includes a first end portion 28 extending from the airbag 24, a second end portion 30 spaced from the airbag 24, and an intermediate portion 32 having a first strap 34 and a second strap 36 extending between and meeting each other at the first end portion 28 and the second end portion 30. The first end portion 28, the second end portion 30, and the intermediate portion 32 are monolithic, i.e., a single piece construction with no seams, stitching, adhesive, etc., securing the first end portion 28, the second end portion 30, and the intermediate portion 32 to each other.

The first strap 34 and the second strap 36 define a loop 38. The loop 38 may be used to fix the tether 26 to the vehicle 22. Since the first end portion 28, the second end portion 30, the first strap 34 and the second strap 36 are monolithic, there is no need to fold the tether 26 and stitch the tether 26 to itself to define a loop. In other words, the first end portion 28 and the second end portion 30 may fix the first strap 34 to the second strap 36 where the first strap 34 and the second strap 36 meet each other and without the need for stitching, adhesive, or other additional manufacturing steps.

The vehicle 22 may be any passenger or commercial automobile such as a car, a truck, a sport utility vehicle, a crossover vehicle, a van, a minivan, a taxi, a bus, etc.

Figure 2:
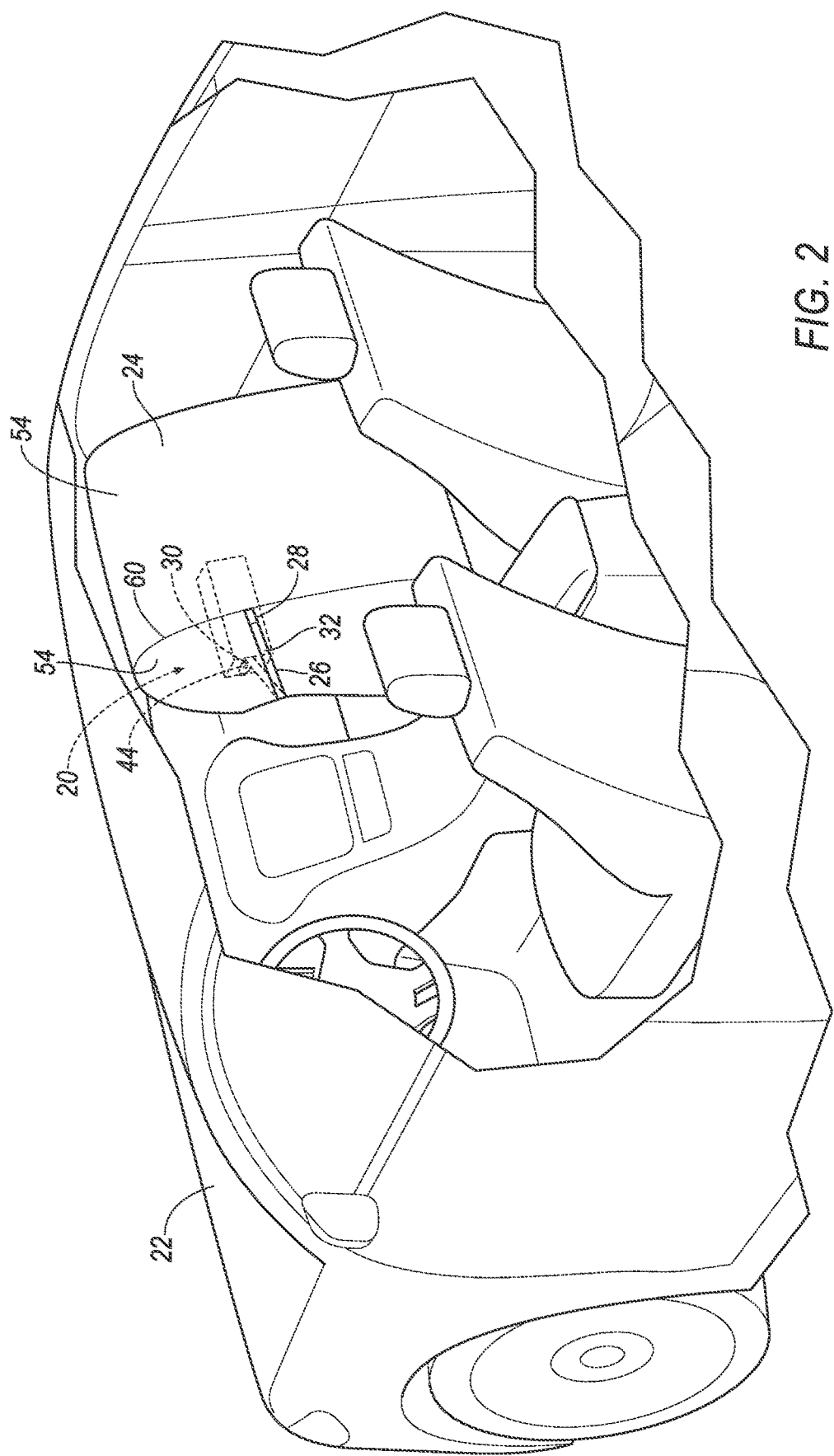
FIG. 2 is a perspective view of the vehicle having the airbag assembly in an inflated position.
Figure 3:
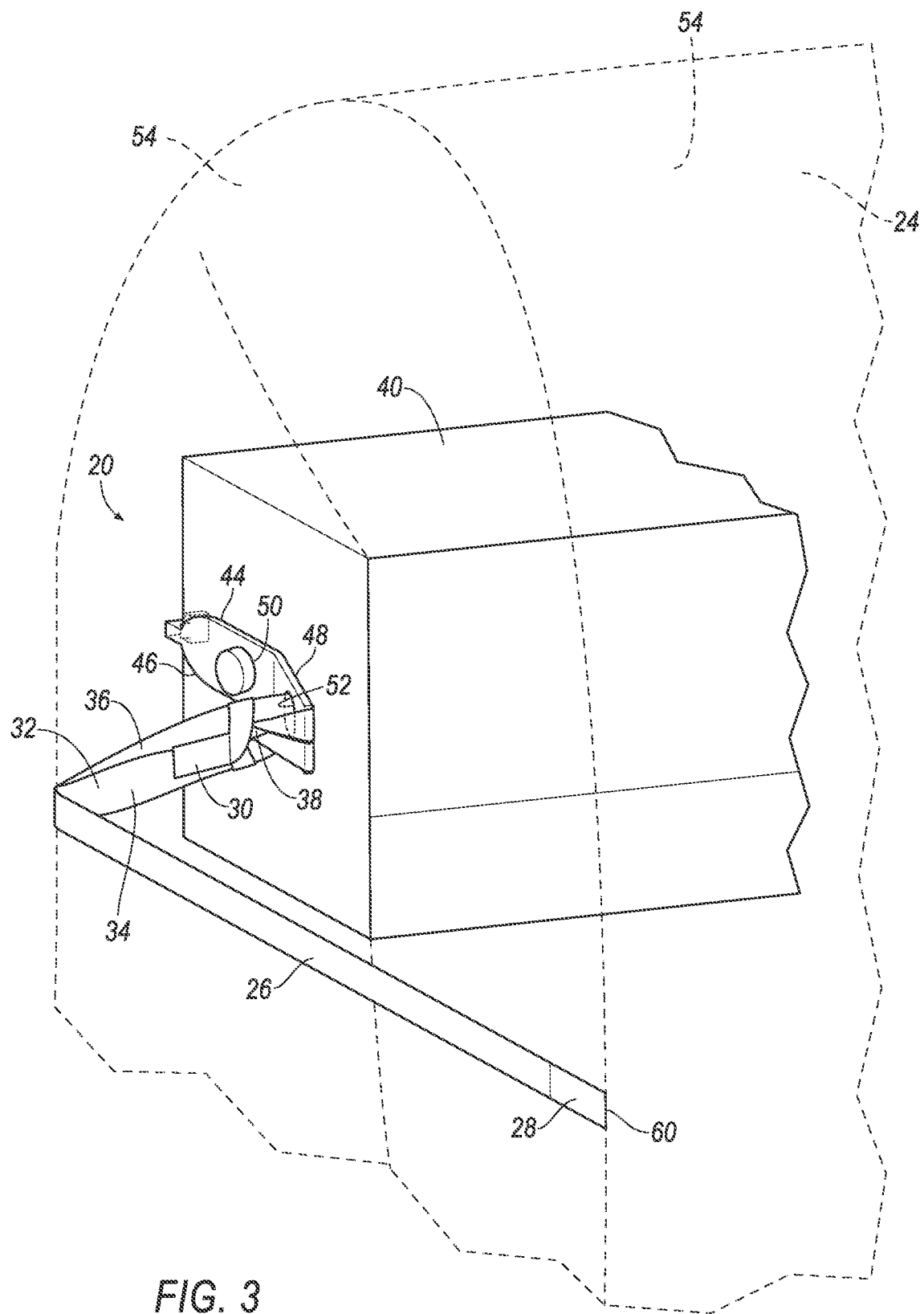
FIG. 3 is a perspective view of the airbag assembly with a tether secured to an anchor.

The airbag assembly 20 may include a housing 40. The housing 40 provides a reaction surface for the airbag 24 in the inflated position, shown in FIG. 2-4. The housing 40 may be supported by an instrument panel, a steering wheel, a roof, etc., of the vehicle 22. The housing 40 may be formed of any material, e.g., a rigid polymer, a metal, a composite, etc.

The airbag assembly 20 may include an inflator 42. The inflator 42 may be connected to the airbag 24. Upon receiving a signal from, e.g., a computer of the vehicle 22, the inflator 42 may inflate the airbag 24 with an inflatable medium, such as a gas. The inflator 42 may be, for example, a pyrotechnic inflator that uses a chemical reaction to drive inflation medium to the airbag 24. The inflator 42 may be of any suitable type, for example, a cold-gas inflator. The inflator 42 may be supported by the housing 40, or any suitable location of the vehicle 22.

The airbag assembly 20 may include an anchor plate 44, shown in FIGS. 2, 3, and 9-10. The anchor plate 44 may be fixed to the housing 40 or to another component of the vehicle 22 and is fixed to the tether 26. The anchor plate 44 anchors the tether 26 to control the shape and/or position of the airbag 24 in the inflated position.

The anchor plate 44 may include a first planar portion 46 and a second planar portion 48. The second planar portion 48 may extend transversely from the first planar portion 46. The anchor plate 44 may define a first hole 50 and a second hole 52. The first hole 50 may be in the first planar portion 46. The second hole 52 may be in the second planar portion 48. The first hole 50 may receive a fastener fixing the anchor plate 44 to the vehicle 22. The second hole 52 may receive the tether 26. In other words, the tether 26 may be in the second hole 52. The anchor plate 44 may be metal, or any suitable material.

The airbag 24 is deployable from an uninflated position to the inflated position, e.g., with inflation medium received from the inflator 42. The airbag 24 may be disposed in the housing 40 in the uninflated position, shown in FIG. 1, and extends from the housing 40 in the inflated position.

The airbag 24 may be formed of a woven polymer or any other material. As one example, the airbag 24 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 24 includes one or more panels 54. The panels 54 enclose an inflation chamber of the airbag 24 in the inflated position. The panels 54 may be fixed to each other, e.g., via stitching, friction welding, adhesive, etc. The panels 54 may be monolithic. For example, the panels 54 may be one-piece woven. One-piece woven panels 54 include interwoven threads forming multiple panels 54, i.e., the panels 54 are continuous with each other via the interwoven threads and free of stitching, adhesive, etc., to secure the panels 54 to each other.

The tether 26 controls the shape and/or position of the airbag 24 in the inflated position. The tether 26 includes the first end portion 28. The first end portion 28 extends from the airbag 24, e.g., from the panel 54. The tether 26 includes the second end portion 30. The second end portion 30 is spaced from the airbag 24.

The tether 26 may be the same type of material or a different type of material than the airbag 24. For example, the tether 26 may be a woven polymer or any other material. As one example, the tether 26 may be of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The tether 26 includes the intermediate portion 32 between the first end portion 28 and the second end portion 30. The intermediate portion 32 defines the loop 38. Specifically, the intermediate portion 32 has the first strap 34 and the second strap 36. The first strap 34 and the second strap 36 both extend between the first end portion 28 and the second end portion 30, and the first strap 34 and the second strap 36 meet each other at the first end portion 28 and at the second end portion 30. The first strap 34 and the second strap 36 enclose the loop 38 between the first end portion 28 and the second end portion 30. For example, the first strap 34 and the second strap 36 may be fixed to the first end portion 28 at a first location 58, e.g., abutting each other and away from a distal edge 60 of the panel 54. The first strap 34 and the second strap 36 may be fixed to the second end portion 30 at a second location 62, e.g., abutting each other and away from a distal edge 64 of the second end portion 30. The second location 62 is spaced from the first location 58, e.g., with the first strap 34 and the second strap 36 elongated therebetween.

The first end portion 28, the second end portion 30, and the intermediate portion 32 are monolithic, i.e., are single, uniform piece of material with no external stitching, adhesives, or fasteners, etc., holding together the first end portion 28, the second end portion 30, and the intermediate portion 32. As one example of being monolithic, the first end portion 28, the second end portion 30, and the intermediate portion 32 may be one-piece woven. When one-piece woven, the first end portion 28, second end portion 30, and intermediate portion 32 include common interwoven threads 66, 68 forming the portions 28, 30, 32. In other words, the first end portion 28, the second end portion 30, and the intermediate portion 32 are continuous with each other via the interwoven threads 66, 68 and do not include external stitching, adhesive, fasteners, etc., to secure to each other.

Figure 5:
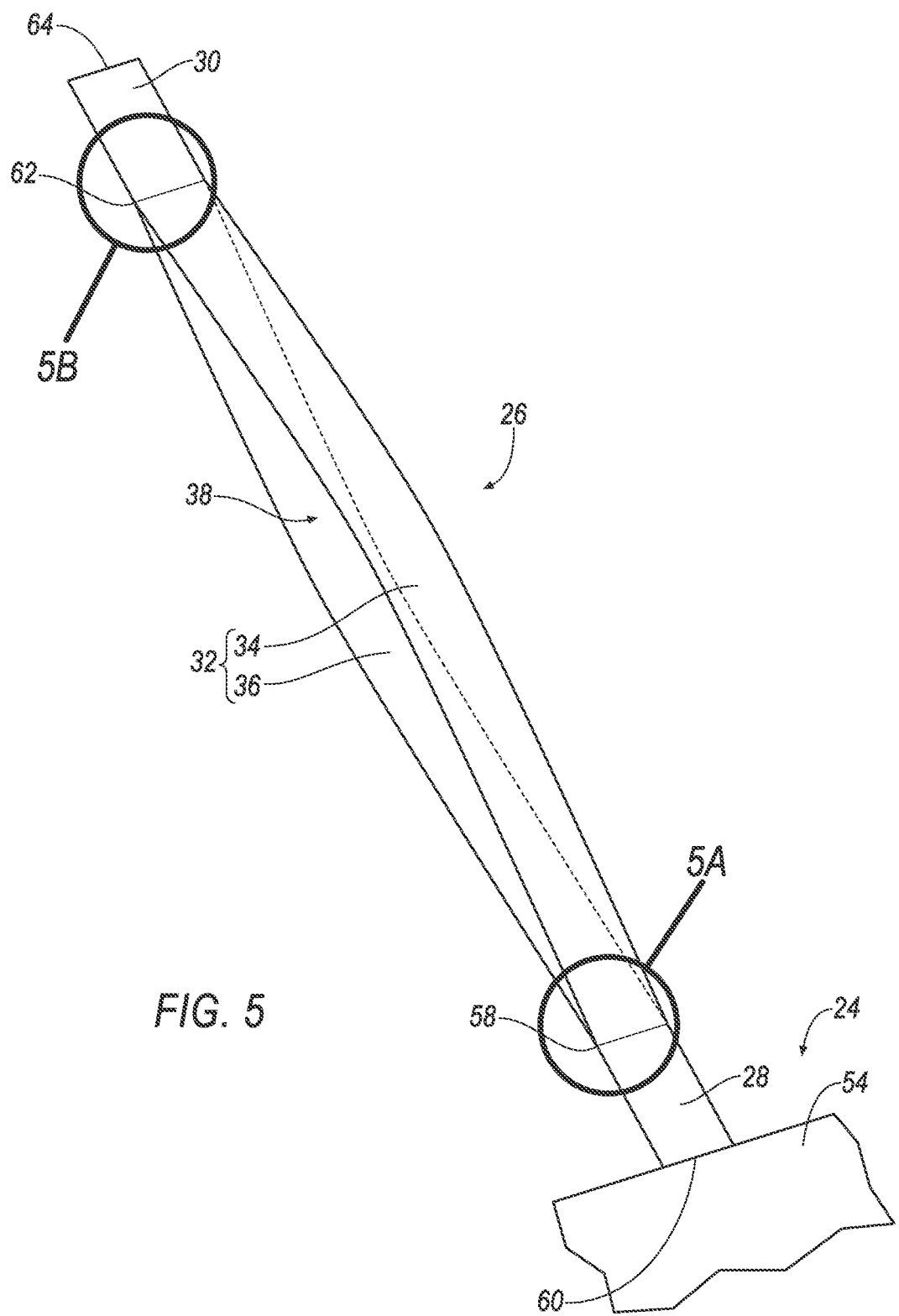
FIG. 5 is a perspective view of the tether.
Figure 5A:
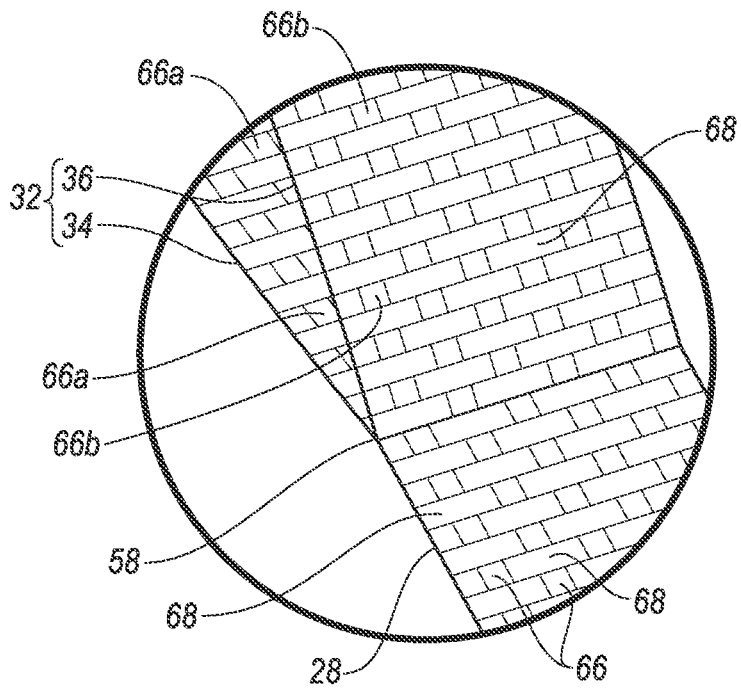
FIG. 5A is a perspective view of a portion of the tether schematically showing threads.
Figure 5B:
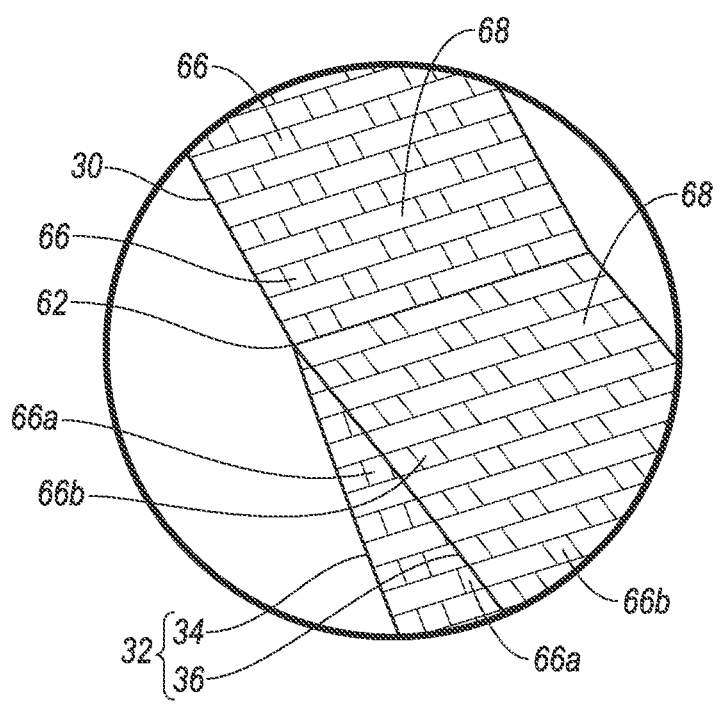
FIG. 5B is a perspective view of another portion of the tether schematically showing threads.

With reference to FIGS. 5, 5A, and 5B, the tether 26 may include a first plurality of threads 66 and a second plurality of threads 68 extending transverse to and interwoven with the first plurality of threads 66. Specifically, the first plurality of threads 66 may extend longitudinally along the tether 26, and the second plurality of threads may extend laterally along the tether 26. The first plurality of threads 66 and the second plurality of threads 68 may be interwoven with each other by one-piece weaving to create the first end portion 28, the second end portion 30, and the intermediate portion 32. FIGS. 5A and 5B schematically showing the first plurality of threads 66 and the second plurality of threads 68 are not to scale, e.g., the dimensions of the threads 66, 68 compared dimensions of the overall tether 26 are not to scale. In other words, the tether 26 may have higher thread count than illustrated in FIGS. 5A and 5B. The threads 66, 68 may be of the material for the tether 26 described above.

Each of the first plurality of threads 66 may extend along the first end portion 28, the second end portion 30, and the intermediate portion 32. A portion 66a of the first plurality of threads 66 may extend along the first strap 34 and not the second strap 36, i.e., the second strap 36 is free of the portion 66a of the first plurality of threads 66. Another portion 66b of the first plurality of threads 66 may extend along the second strap 36 and not the first strap 34, i.e., the first strap 34 is free of the portion 66b of the first plurality of threads 66.

The tether 26 and the panel 54 of the airbag 24 may be monolithic. As an example of being monolithic, the panel 54, the first end portion 28, the second end portion 30, and the intermediate portion 32 of the tether 26 may be one-piece woven, e.g., the first plurality of threads 66 may extend from the first end portion 28 along the panel 54. The first plurality of threads 66 may be interwoven with other threads of the panel 54. The monolithic tether 26 and panel 26 are secured to each other without the need for stitching, adhesive, fasteners, etc. The monolithic tether 26 and panel 54 help to reduce cost and increase efficiency in manufacturing the airbag assembly 20. For example, the tether 26 and the panel 54 may be cut as a single piece from a sheet of interwoven material, eliminating the need for sewing, bonding, or other secondary manufacturing steps to secure the tether 26 to the panel 54.

Figure 4:
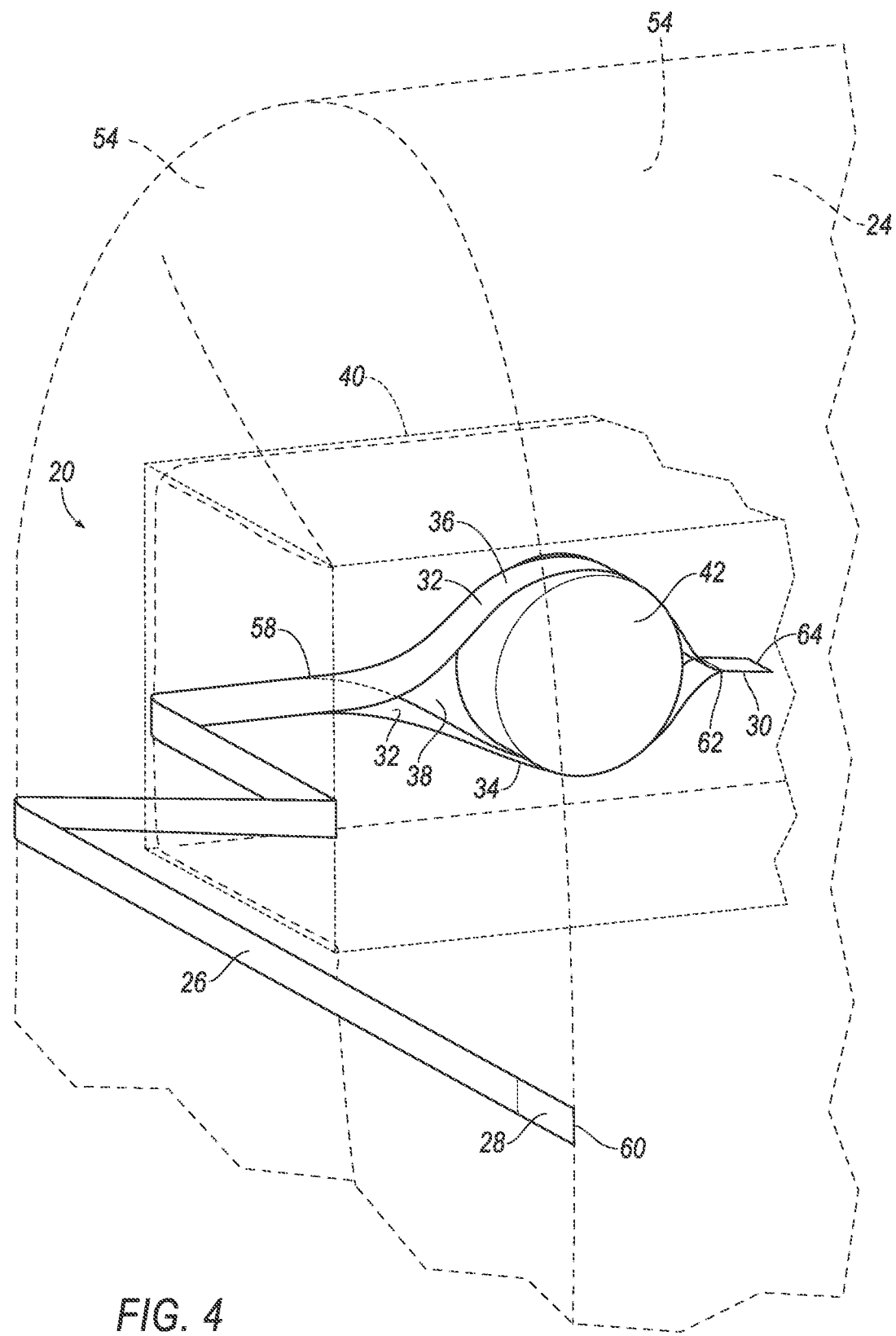
FIG. 4 is a perspective view of the airbag assembly with the tether secured to an inflator.
Figure 12:
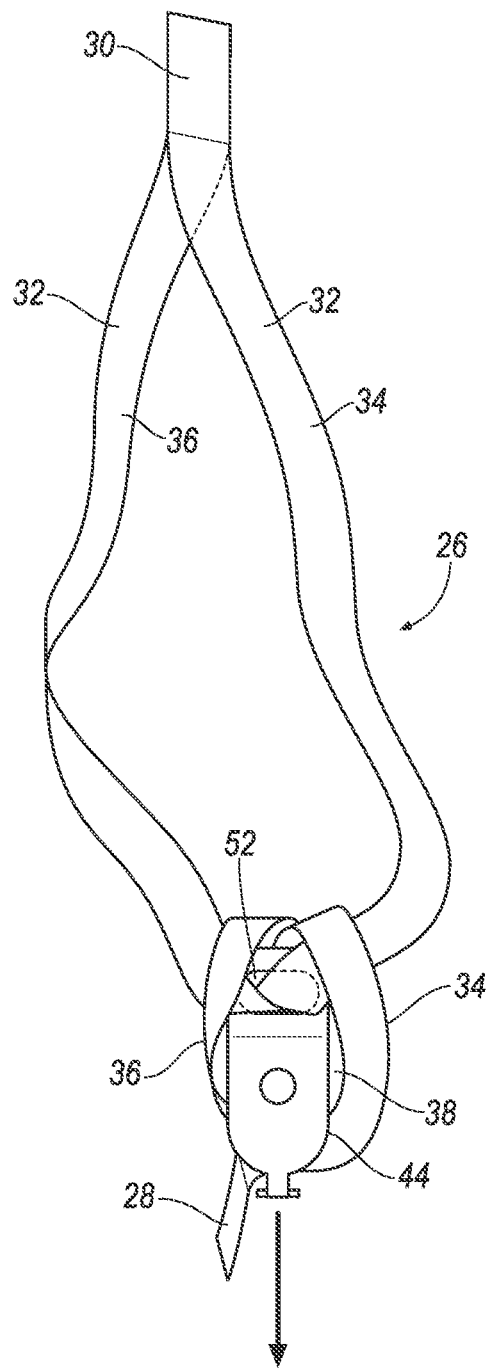
FIG. 12 is a perspective view of the anchor being inserted into the loop of the tether.

The tether 26 may be fixed relative to the airbag assembly 20 and/or vehicle 22 via the loop 38. For example, the anchor plate 44 may be in the loop 38, as shown in FIG. 12. In other words, the anchor plate 44 may be between the first strap 34 and the second strap 36 of the intermediate portion 32. As another example, the inflator 42 may be in the loop 38, as shown in FIG. 4. In other words, the inflator 42 may be between the first strap 34 and the second strap 36 of the intermediate portion 32.

Figure 6:
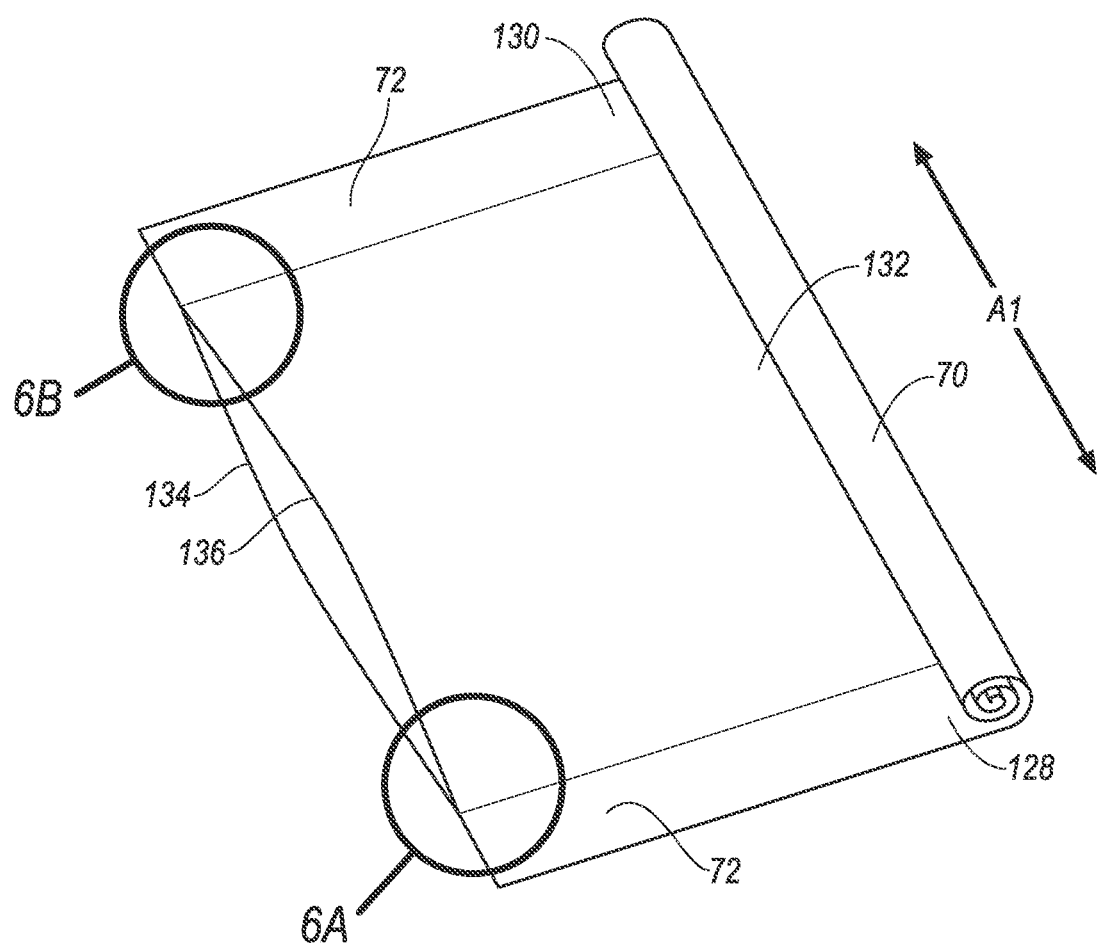
FIG. 6 is a perspective view of a roll of woven fabric for making the tether.
Figure 13:
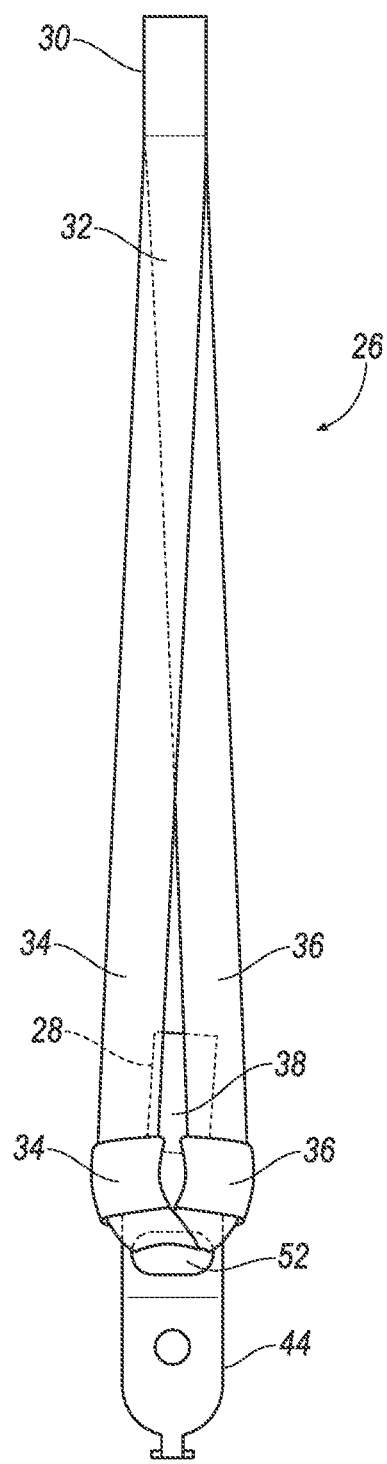
FIG. 13 is a perspective view of the tether fixed to the anchor.
Figure 14:
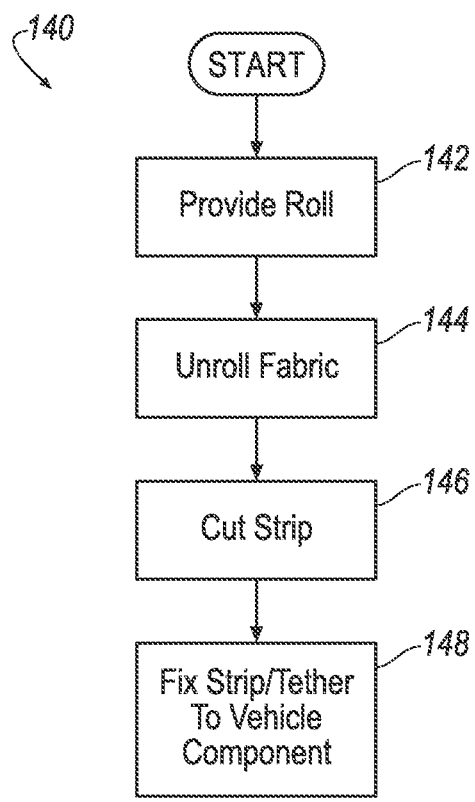
FIG. 14 is a flow chart illustrating a method to make and attached the tether.

A method 140 of forming the tether 26 is illustrated in FIGS. 7-14. With reference to FIG. 14, the method 140 begins at a step 142 which includes providing a roll of woven fabric 70, shown in FIG. 6. The roll of woven fabric 70 is elongated along an axis μl. In other words, the roll of woven fabric 70 may encircle the axis μl. The woven fabric 70 has a first end portion 128 and a second end portion 130. The first end portion 128 and the second end portion 130 are spaced from each other along the axis μl. The first end portion 128 and the second end portion 130 each having a single panel 72. The woven fabric 70 has an intermediate portion 132. The intermediate portion 132 extends between the first end portion 128 and the second end portion 130. The intermediate portion 132 has double panels 134, 136.

Figure 6A:
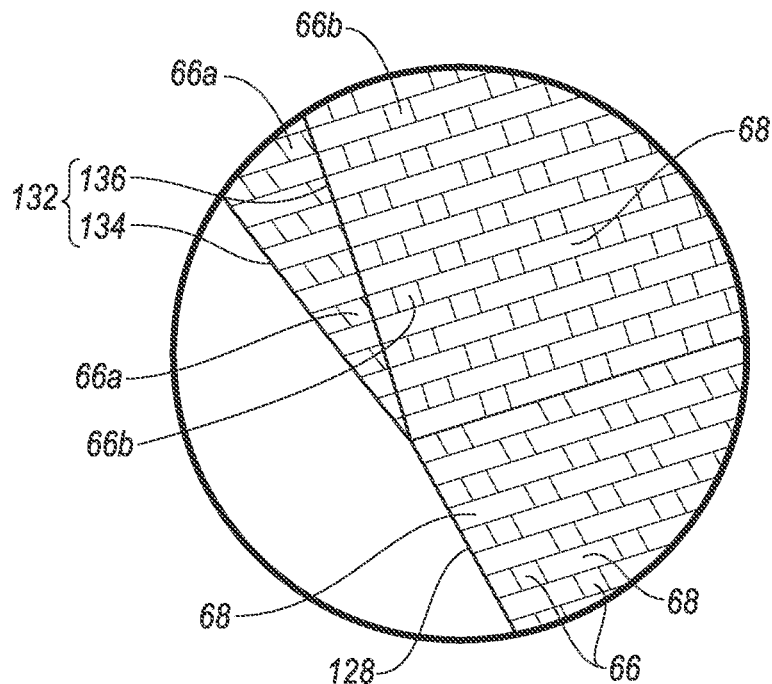
FIG. 6A is a perspective view of a portion of the roll of woven fabric schematically showing threads.
Figure 6B:
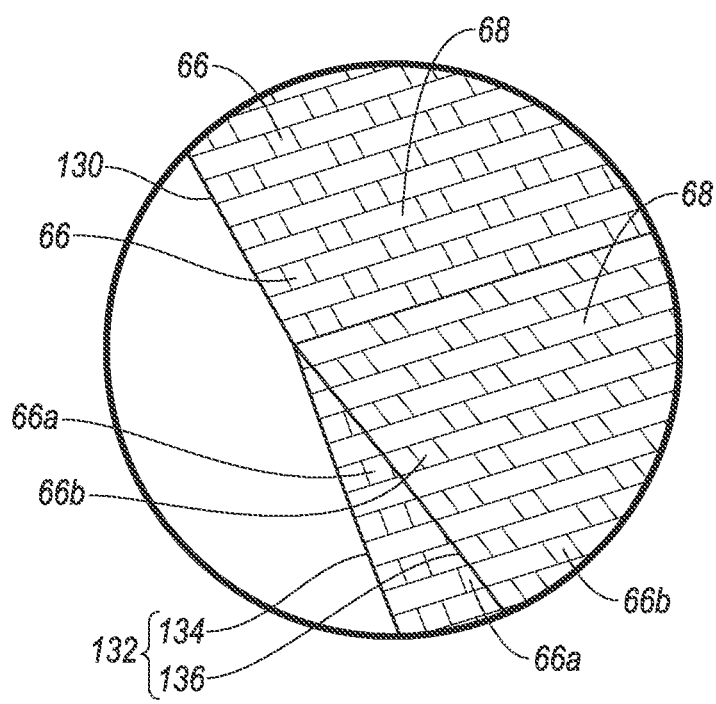
FIG. 6B is another perspective view of another portion of the roll of woven fabric schematically showing the threads.

The roll of woven fabric 70 is one-piece woven. The roll of woven fabric 70, e.g., the first end portion 128, the second end portion 130, and intermediate portion 132 include common interwoven threads 66, 68 forming the portions 128, 130, 132, shown in the schematics of FIGS. 6A and 6B, e.g., as described above for the portions 28, 30, 32 in FIGS. 5A and 5B. In other words, the first end portion 128, the second end portion 130, and the intermediate portion 132 are continuous with each other via the interwoven threads 66, 68 and do not require stitching, adhesive, etc., to secure to each other. For example, the first end portion 128, the second end portion 130, and the intermediate portion 132 may include the first plurality of threads 66 and the second plurality of threads 68. For example, a portion 66a of the first plurality of threads 66 may extend along the one of the double panels 134 and not the other of the double panels 136, and another portion 66b of the first plurality of threads 66 may extend along the one of the double panels 136 and not the other of the double panels 134, e.g., as discussed above for the tether 26.

The roll of woven fabric 70 may be formed by one-piece weaving. One-piece weaving may include weaving with a loom that interweaves the pluralities of threads 66, 68, e.g., to form roll of woven fabric 70 with the first end portion 128, the second end portion 130, and the intermediate portion 132 being continuous with each other and without require stitching, adhesive, etc., to secure to each other. For example, the first plurality of threads 66 may be weft threads, and the second plurality of threads 68 may be warp threads.

Next, a step 144 includes unrolling an amount of the woven fabric 70 from the roll. Woven fabric 70 may be unrolled manually and/or with a machine.

Figure 7:
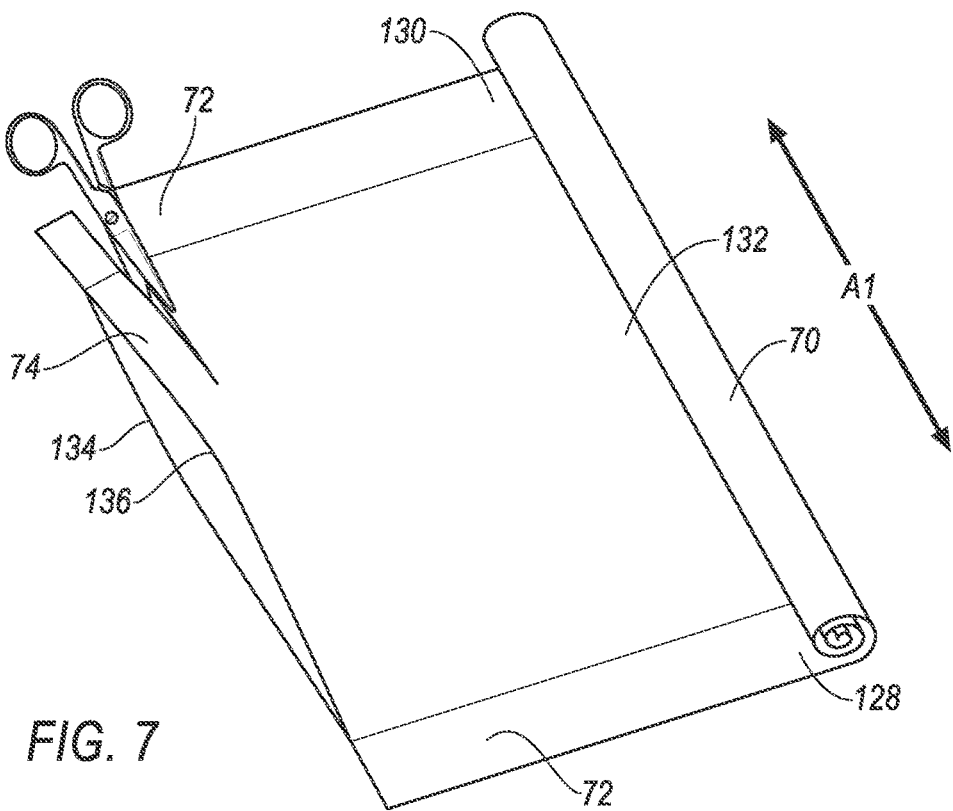
FIG. 7 is a perspective view of the tether being cut from the roll of woven fabric.
Figure 8:
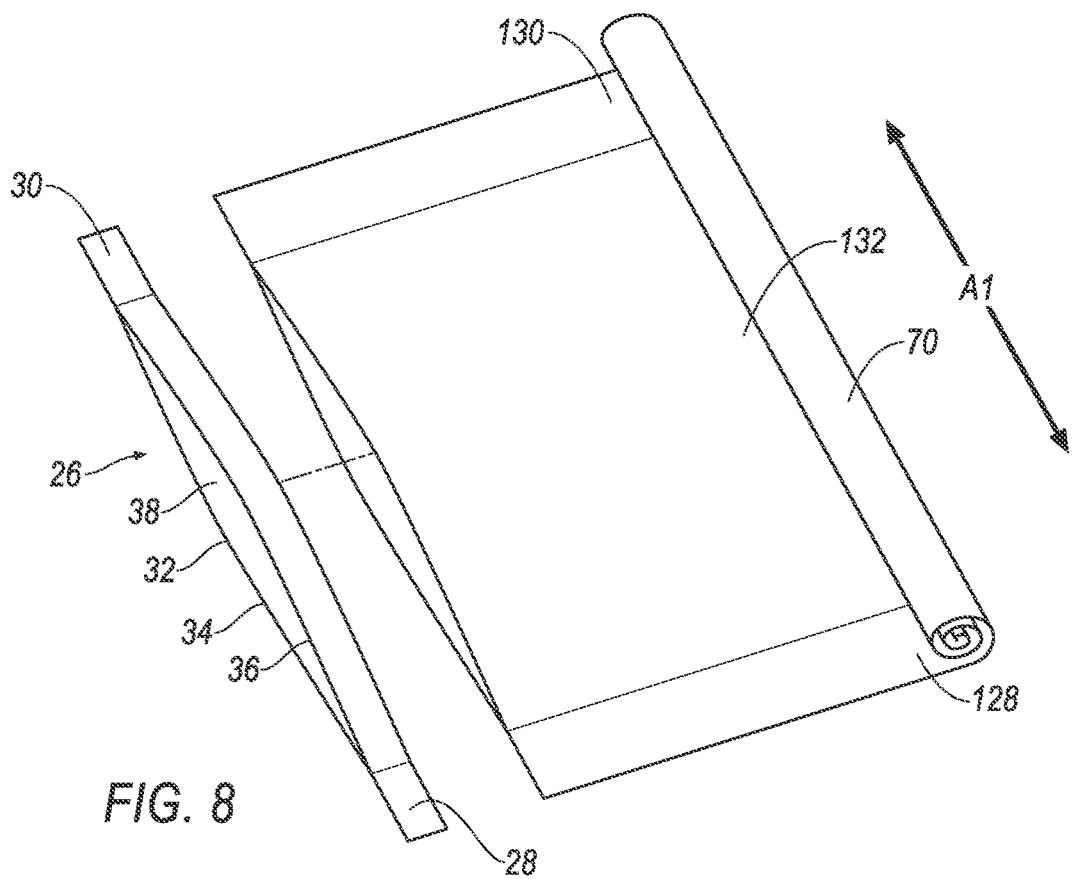
FIG. 8 is a perspective view of the tether separated from the roll of woven fabric.

Next, a step 146 includes cutting the tether 26 from the unrolled amount of woven fabric 70 along the first end portion 128, the second end portion 130, and the intermediate portion 132 to separate the tether from the roll of woven fabric, shown in FIGS. 7 and 8. In other words, a strip 74 is cut from the unrolled amount of woven fabric 70 to create the tether 26. The cut may be taken parallel to the axis μl. The first end portion 128 of the woven fabric 70 may provide the first portion 28 of the tether 26, the second end portion 130 of the woven fabric 70 may provide the second portion 30 of the tether 26, and the intermediate portion 132 of the woven fabric 70 may provide the intermediate portion 32 of the tether 26. The cutting may be performed manually and/or with an automated machine.

Next, a step 148 includes fixing the tether 26 to a component of the airbag assembly 20. The component of the of the airbag assembly 20 may be the anchor plate 44, the inflator 42, etc.

Figure 9:
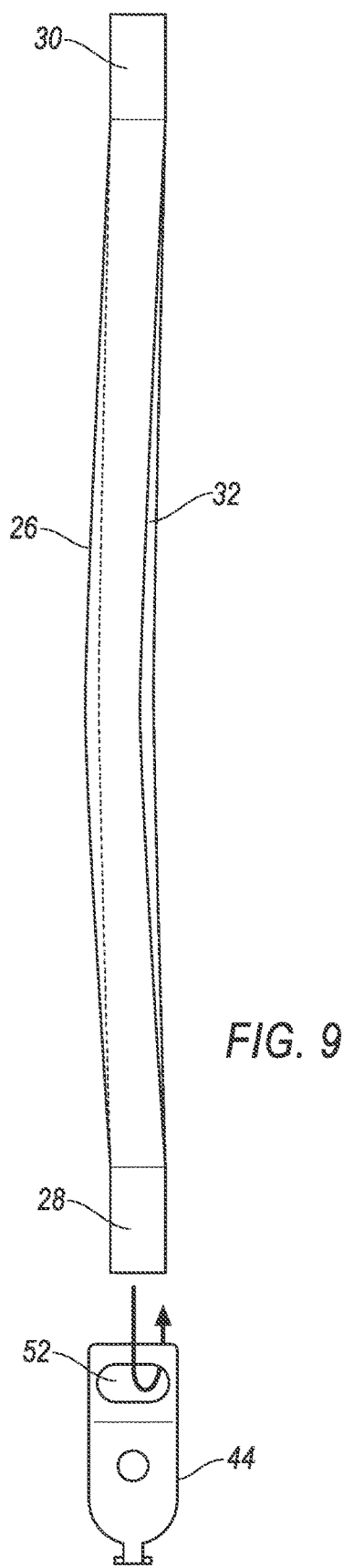
FIG. 9 is a perspective view of the tether being inserted into the anchor.
Figure 10:
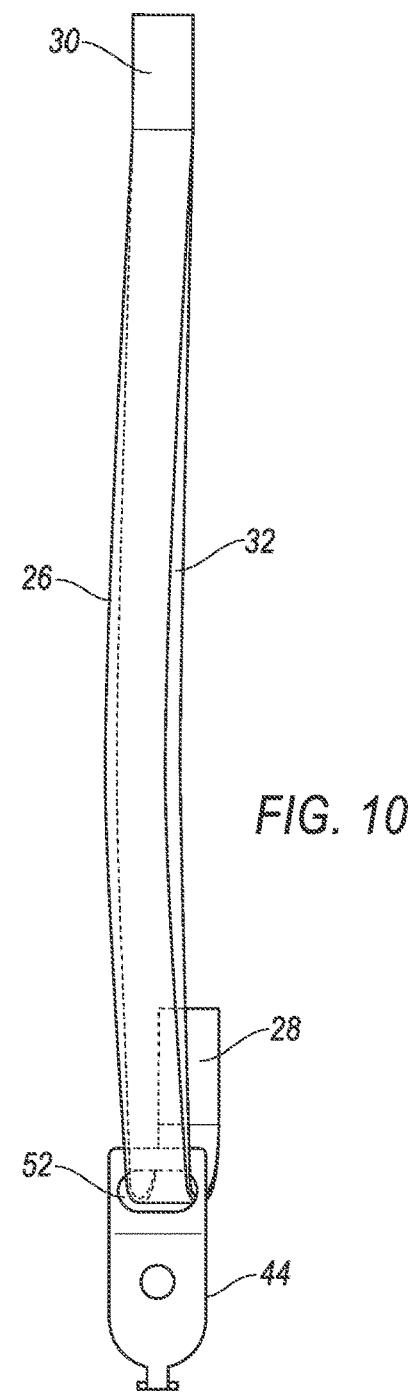
FIG. 10 is a perspective view of the tether inserted into the anchor.
Figure 11:
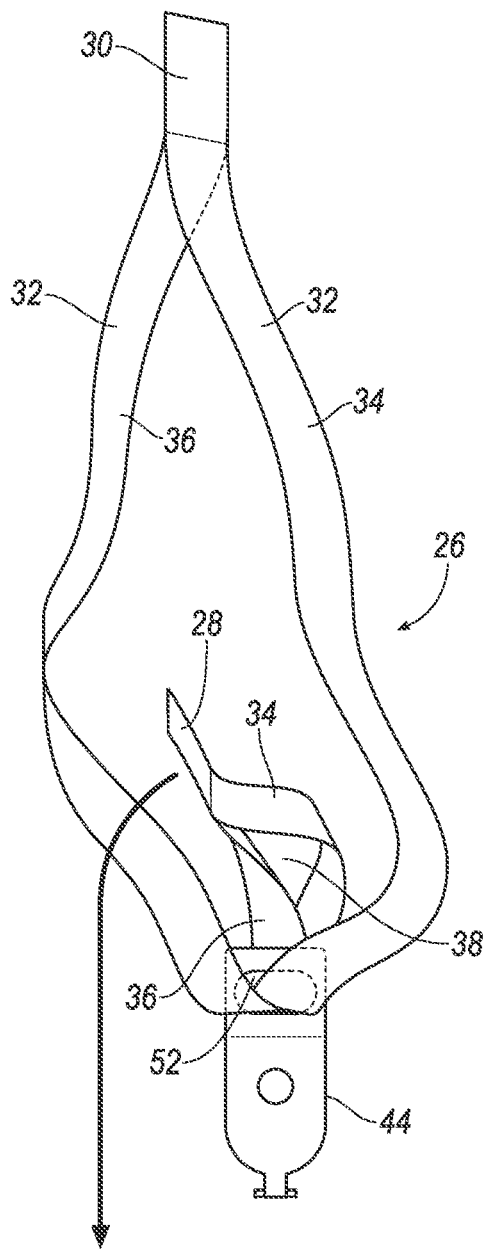
FIG. 11 is a perspective view of the tether being inserted into a loop of the tether.

Fixing the tether 26 to the anchor plate 44 may include first placing the tether 26 into the hole 52, e.g., the first end portion 28 may be threaded through the hole 52 of the anchor plate 44, as shown in FIGS. 9 and 10. Fixing the tether 26 to the anchor plate 44 may then include placing the anchor plate 44 into the loop 38 of the intermediate portion 32 of the tether 26, e.g., the anchor plate 44 may be threaded through the loop 38 as shown in FIGS. 11 and 12. Finally, the tether 26 may be pulled tight, e.g., to tighten the loop 38 around the anchor plate 44, as shown in FIG. 13.

Fixing the tether 26 to the inflator 42 may include placing the inflator 42 into the loop 38 of the intermediate portion 32 of the tether 26. For example, the first strap 34 and the second strap 36 may be separated to open the loop 38. The loop 38 may then be placed around the inflator 42, as shown in FIG. 4.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly, comprising:
   an airbag; and
   a tether including a first end portion extending from the airbag, a second end portion spaced from the airbag, and an intermediate portion having a first strap and a second strap extending between and meeting each other at the first end portion and the second end portion; and
   the first end portion, the second end portion, and the intermediate portion are monolithic.

2. The airbag assembly of claim 1, wherein the first end portion, the second end portion, and the intermediate portion are one-piece woven.

3. The airbag assembly of claim 1, wherein the tether includes a first plurality of threads each extending along the first end portion, the second end portion, and the intermediate portion.

4. The airbag assembly of claim 3, wherein the tether includes a second plurality of threads extending transverse to and interwoven with the first plurality of threads.

5. The airbag assembly of claim 1, wherein the airbag includes a panel, and the panel and the tether are monolithic.

6. The airbag assembly of claim 5, wherein the panel, the first end portion, the second end portion, and the intermediate portion are one-piece woven.

7. The airbag assembly of claim 5, further comprising a plurality of threads extending along the panel, the first end portion, the second end portion, and the intermediate portion.

8. The airbag assembly of claim 1, wherein the first strap and the second strap are fixed to the first end portion at a first location and to the second end portion at a second location spaced from the first location.

9. The airbag assembly of claim 1, further comprising an anchor plate, the tether fixed to the anchor plate.

10. The airbag assembly of claim 9, wherein the intermediate portion of the tether defines a loop and the anchor plate defines a hole, and wherein the anchor plate is in the loop and the tether is in the hole.

11. The airbag assembly of claim 10, wherein the anchor plate includes a first planar portion defining the hole, and a second planar portion extending transversely from the first planar portion and defining a second hole.

12. The airbag assembly of claim 1, further comprising an inflator, wherein the intermediate portion of the tether defines a loop, and the inflator is in the loop.

13. A method of forming an airbag tether, comprising:
providing a roll of woven fabric, the roll elongated along an axis, the woven fabric having a first end portion and a second end portion spaced from each other along the axis and each having a single panel, and an intermediate portion extending between the first end portion and the second end portion and having double panels;
unrolling an amount of the woven fabric from the roll;
cutting a tether from the unrolled amount of woven fabric along the first end portion, the second end portion, and the intermediate portion to separate the tether from the roll of woven fabric; and
fixing the tether to a component of an airbag assembly.

14. The method of claim 13, wherein the component of the airbag assembly is an anchor plate that defines a hole.

15. The method of claim 14, wherein fixing the tether to the anchor plate includes placing the tether into the hole, and then placing the anchor plate into a loop of an intermediate portion of the tether.

16. The method of claim 13, wherein the component of the airbag assembly is an inflator.

17. The method of claim 16, wherein fixing the tether to the inflator includes placing the inflator into a loop of an intermediate portion of the tether.

18. The method of claim 13, wherein the roll of woven fabric is one-piece woven.

19. The method of claim 13, wherein providing the roll of woven fabric includes forming the woven fabric by one-piece weaving.

* * * * *